United States Patent
Jiang et al.

(10) Patent No.: US 11,236,230 B2
(45) Date of Patent: Feb. 1, 2022

(54) CHLORINATED POLY(PROPYLENE CARBONATE)/BIOMASS COMPOSITE MATERIAL AND METHOD FOR PREPARING THE SAME

(71) Applicant: Changchun Institute of Applied Chemistry Chinese Academy of Sciences, Changchun (CN)

(72) Inventors: Wei Jiang, Changchun (CN); Yunbao Gao, Changchun (CN); Xihua Cui, Changchun (CN); Jie Cui, Changchun (CN); Jingchuan Liu, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 84 days.

(21) Appl. No.: 16/630,336

(22) PCT Filed: Oct. 26, 2017

(86) PCT No.: PCT/CN2017/107813
§ 371 (c)(1),
(2) Date: Jan. 10, 2020

(87) PCT Pub. No.: WO2019/019443
PCT Pub. Date: Jan. 31, 2019

(65) Prior Publication Data
US 2020/0172727 A1 Jun. 4, 2020

(30) Foreign Application Priority Data
Jul. 25, 2017 (CN) .......................... 201710613749.7

(51) Int. Cl.
*C08L 69/00* (2006.01)
*C08K 3/26* (2006.01)
*C08L 93/04* (2006.01)

(52) U.S. Cl.
CPC ................ *C08L 69/00* (2013.01); *C08K 3/26* (2013.01); *C08L 93/04* (2013.01); *C08K 2003/265* (2013.01)

(58) Field of Classification Search
CPC .......... C08L 69/00; C08L 93/04; C08L 99/00; C08L 97/02; C08L 2205/03; C08K 3/26; C08K 2003/265; B27N 3/002; B27N 3/007; B27N 3/02
See application file for complete search history.

(56) References Cited

U.S. PATENT DOCUMENTS 6,605,245 B1 * 8/2003 Dubelsten ............... B32B 23/08
264/446

FOREIGN PATENT DOCUMENTS

| CN | 1360994 | A | 7/2002 | |
|---|---|---|---|---|
| CN | 1475455 | A | 2/2004 | |
| CN | 1833839 | A | 9/2006 | |
| CN | 101186754 | A * | 11/2006 | ............. B29C 48/04 |
| CN | 201136203 | Y | 10/2008 | |
| CN | 101698749 | | 10/2011 | |
| CN | 103881078 | A | 6/2014 | |
| CN | 104449521 | | 3/2015 | |
| CN | 104449521 | A * | 3/2015 | ............. C09J 11/04 |
| CN | 106752007 | A | 5/2017 | |
| CN | 107236323 | A | 10/2017 | |

OTHER PUBLICATIONS

Lichen, Haoyang et al., "Preparation and Properties of the Poly(propylene carbonate) /Straw Flour Composites Compatibilized", Chinese Journal of Applied Chemistry, Jul. 10, 2017, pp. 744-748, with English abstract.
EP Extended Search Report in European Appln. No. 17919501.1, dated Apr. 7, 2021, 7 pages.
ISA/CN, International Search Report issued for PCT/CN2017/107813 (dated Apr. 27, 2018).

* cited by examiner

*Primary Examiner* — Robert S Jones, Jr.
(74) *Attorney, Agent, or Firm* — Fish & Richardson P.C.

(57) ABSTRACT

The present invention provides a chlorinated poly(propylene carbonate)/biomass composite material, comprising 3 wt % to 57 wt % of a chlorinated poly(propylene carbonate); 40 wt % to 94 wt % of a biomaterial; 2 wt % to 20 wt % of a rosin or a rosin derivative; 0 wt % to 1 wt % of an antioxidant; and 0 wt % to 5 wt % of a filler, wherein a sum of amounts of all components is 100 wt %. The chlorinated poly(propylene carbonate) functions as a binder, and plays an important role in the moisture resistance of the composite material. The rosin or the rosin derivative functions as a viscosifier and a lubricant, and can also improve the moisture resistance and mechanical property of the composite material. Under the synergistic effect of the above components, the composite material obtained in the present invention is excellent in both mechanical property and moisture resistance. Further, because the starting materials comprise a larger amount of biomass materials, the cost thereof is low, and because the starting materials contain no formaldehyde, benzene and the like, the material is environment friendly.

13 Claims, 3 Drawing Sheets

CHLORINATED POLY(PROPYLENE CARBONATE)/BIOMASS COMPOSITE MATERIAL AND METHOD FOR PREPARING THE SAME

CROSS-REFERENCE TO RELATED APPLICATIONS

This application is a U.S. National Phase application under 35 U.S.C. § 371 of International Patent Application No. PCT/CN2017/107813, filed on Oct. 26, 2017, which claims priority to Chinese Application No. 201710613749.7, filed on Jul. 25, 2017. The entire contents of the parent applications are hereby incorporated by reference.

FIELD OF THE INVENTION

The present invention relates to the field of biomass composite material and in particular to a chlorinated poly(propylene carbonate)/biomass composite material and a method for preparing the same.

BACKGROUND OF THE INVENTION

Biomasses such as straws, wood chips (including bamboo chips), rice hulls, and wheat straws are byproducts in agricultural production and forestry processing. They have a large production, but low use efficiency, and some of them even become a burden of society. For example, straws produced in China per year exceed 1 billion tons. Only Jilin province can produce up to 35 million tons of corn straw per year. At present, there are mainly three ways of processing corn straw: 1. being used as silage; 2. being pulverized and returned to field; and 3. being collected for utilization. However, the amount of corn straw processed in these ways is less than ⅓ of the total amount. Most is still not effectively processed, and can only be directly burned, resulting in severe environmental pollution.

CN patent applications CN1475455A and CN1833839A disclose methods of preparing polymer/biomass composite material by compounding a biomass and polymer resins, which turn waste into things of value, for use in the fields of automobiles, buildings and so on. However, the above methods require modifying the surface of the biomass with a complex process. At the same time, the loading level of respective biomass is very limited, typically less than 40 wt %, and thus the utilization efficiency of the biomass is not high.

CN patent applications CN1360994A and CN201136203Y disclose a straw densified board and a fiber composite board prepared from straws and polymer resins, which solve the above problems. However, because it is inevitably required to use formaldehyde in starting materials, the health of human body is threatened and the material is not environment friendly.

SUMMARY OF THE INVENTION

In view of the foregoings, the technical problem to be solved by the present invention is to provide a chlorinated poly(propylene carbonate)/biomass composite material and a method for preparing the same. The composite material as disclosed in the present invention comprises a larger amount of biomass materials, is environment friendly, and further has an excellent mechanical property.

The present invention provides a chlorinated poly(propylene carbonate)/biomass composite material, comprising:

3 wt % to 57 wt % of a chlorinated poly(propylene carbonate);
40 wt % to 94 wt % of a biomaterial;
2 wt % to 20 wt % of a rosin or a rosin derivative;
0 wt % to 1 wt % of an antioxidant; and
0 wt % to 5 wt % of a filler,
wherein a sum of amounts of all components is 100 wt %.

Preferably, an amount of the chlorinated poly(propylene carbonate) is from 5 wt % to 50 wt %.

Preferably, the chlorinated poly(propylene carbonate) has a weight average molecular weight in a range of 30,000 to 650,000.

Preferably, the chlorinated poly(propylene carbonate) has a chlorination degree in a range of 2 wt % to 15 wt %.

Preferably, the chlorinated poly(propylene carbonate) has a structure represented by Formula (I) below:

wherein x is an integer of 0 to 3, y is an integer of 0 to 2, and z is an integer of 0 to 1, with the proviso that not all of x, y and z are 0; and n is a polymerization degree of 50 to 5000.

Preferably, the biomaterial is one or more selected from a group consisting of straws, wood chips, halms, rice hulls, bamboo powders and wheat straws.

Preferably, an amount of the biomaterial is from 50 wt % to 94 wt %.

Preferably, the rosin derivative is a rosin soap, a rosin ester or a rosin-modified phenolic resin.

Preferably, an amount of the rosin or the rosin derivative is from 3 wt % to 15 wt %.

Preferably, the antioxidant is Antioxidant 1010.

Preferably, the filler is calcium carbonate or paraffin.

Preferably, an amount of the antioxidant is from 0 wt % to 0.2 wt %, and an amount of the filler is from 0 wt % to 1 wt %.

The present invention further provides a method for preparing a chlorinated poly(propylene carbonate)/biomass composite material, comprising:

A) mixing 3 wt % to 57 wt % of a chlorinated poly(propylene carbonate), 40 wt % to 94 wt % of a biomaterial, 2 wt % to 20 wt % of a rosin or a rosin derivative, 0 wt % to 1 wt % of an antioxidant, and 0 wt % to 5 wt % of a filler to obtain a mixture, wherein a sum of amounts of all components is 100 wt %; and

B) subjecting the mixture to extrusion molding to obtain a chlorinated poly(propylene carbonate)/biomass composite material; or subjecting the mixture to spreading, preheating, hot pressing, and then cold press molding to obtain a chlorinated poly(propylene carbonate)/biomass composite material; or subjecting the mixture to melt blending, granulating, and then injection molding to obtain a chlorinated poly(propylene carbonate)/biomass composite material.

Preferably, in the above method, an amount of the chlorinated poly(propylene carbonate) is from 5 wt % to 50 wt %.

Preferably, in the above method, the chlorinated poly(propylene carbonate) has a weight average molecular weight in a range of 30,000 to 650,000.

Preferably, in the above method, the chlorinated poly(propylene carbonate) has a chlorination degree in a range of 2 wt % to 15 wt %.

Preferably, in the above method, the chlorinated poly(propylene carbonate) has a structure represented by Formula (I) below:

(I)

wherein x is an integer of 0 to 3, y is an integer of 0 to 2, and z is an integer of 0 to 1, with the proviso that not all of x, y and z are 0; and n is a polymerization degree of 50 to 5000.

Preferably, in the above method, the biomaterial is one or more selected from a group consisting of straws, wood chips, halms, rice hulls, bamboo powders and wheat straws.

Preferably, in the above method, an amount of the biomaterial is from 50 wt % to 94 wt %.

Preferably, in the above method, the rosin derivative is a group consisting of a rosin soap, a rosin ester or a rosin-modified phenolic resin.

Preferably, in the above method, an amount of the rosin or the rosin derivative is from 3 wt % to 15 wt %.

Preferably, in the above method, the antioxidant is Antioxidant 1010.

Preferably, in the above method, the filler is calcium carbonate or paraffin.

Preferably, in the above method, an amount of the antioxidant is from 0 wt % to 0.2 wt %, and an amount of the filler is from 0 wt % to 1 wt %.

The present invention provides a chlorinated poly(propylene carbonate)/biomass composite material, comprising:
   3 wt % to 57 wt % of a chlorinated poly(propylene carbonate);
   40 wt % to 94 wt % of a biomaterial;
   2 wt % to 20 wt % of a rosin or a rosin derivative;
   0 wt % to 1 wt % of an antioxidant; and
   0 wt % to 5 wt % of a filler,
   wherein a sum of amounts of all components is 100 wt %.

In the chlorinated poly(propylene carbonate)/biomass composite material provided in the present invention, in addition to functioning as a binder, the chlorinated poly(propylene carbonate) can provide the composite material with heat shrinkage property and flowability, and also play an important role in the moisture resistance of the composite material as formed. In addition to serving as a viscosifier and a lubricant, the rosin or rosin derivative added can improve the moisture resistance of the composite material. Meanwhile, the rosin or rosin derivative can also enhance the impregnation of the chlorinated poly(propylene carbonate), thereby improving the mechanical property of the chlorinated poly(propylene carbonate)/biomass composite material. Under the synergistic effect of the above components, the chlorinated poly(propylene carbonate)/biomass composite material obtained in the present invention is excellent in both moisture resistance and mechanical property. Further, because the composite material of the invention comprises a larger amount of biomass materials and the starting materials contain no formaldehyde, benzene and the like, the composite material is low in cost thereof and environment friendly.

DETAILED DESCRIPTION OF THE INVENTION

The technical solutions of the present invention will be detailedly described below in combination with the embodiments of the present invention. Obviously, the embodiments described are only parts of, not all of the embodiments of the present invention. All of other embodiments obtained by those skilled in the art based on the embodiments of the present invention, without inventive efforts, fall within the protection scope of the present invention.

The present invention provides a chlorinated poly(propylene carbonate)/biomass composite material, comprising:
   3 wt % to 57 wt % of a chlorinated poly(propylene carbonate);
   40 wt % to 94 wt % of a biomaterial;
   2 wt % to 20 wt % of a rosin or a rosin derivative;
   0 wt % to 1 wt % of an antioxidant; and
   0 wt % to 5 wt % of a filler,
   wherein a sum of amounts of all components is 100 wt %.

The chlorinated poly(propylene carbonate)/biomass composite material provided in the present invention comprises a new material, that is, a chlorinated poly(propylene carbonate). The chlorinated poly(propylene carbonate) has a weight average molecular weight in a range of 30,000 to 650,000, and preferably 150,000 to 400,000.

Preferably, the chlorinated poly(propylene carbonate) has a structure represented by Formula (I):

(I)

wherein x is an integer of 0 to 3, y is an integer of 0 to 2, and z is an integer of 0 to 1, with the proviso that not all of x, y and z are 0; and n is a polymerization degree of preferably 50 to 5000.

In addition to functioning as a binder, the chlorinated poly(propylene carbonate) can provide the composite material as formed with heat shrinkage property and flowability, and also play an important role in the moisture resistance of the composite material as formed. An amount of the chlorinated poly(propylene carbonate) is from 3 wt % to 57 wt %, preferably from 5 wt % to 50 wt %, and more preferably from 5 wt % to 30 wt %. The chlorinated poly(propylene carbonate) in an amount of from 30 wt % to 57 wt % influences the moisture resistance of the composite more significantly.

The chlorinated poly(propylene carbonate)/biomass composite material provided in the present invention comprises a biomaterial. Biomass materials are used as renewable resources in starting materials of the composite material. This not only solves the pollution caused by the burning of unconsumed biomass materials, but also reduces the production cost of the composite material, resulting in extremely considerable social and economic benefits. In the present invention, the biomaterial is preferably one or more selected from a group consisting of straws, wood chips, halms, rice hulls, bamboo powders and wheat straws, and more preferably one or more selected from a group consisting of straw powders, wood chip powders, halm powders, rice hull powders, bamboo powders and wheat straws. In the composite material provided in the present invention, the amount of the biomaterial is high, and can be from 40 wt % to 94 wt %, preferably from 50 wt % to 94 wt %, and more preferably from 70 wt % to 90 wt %.

The chlorinated poly(propylene carbonate)/biomass composite material provided in the present invention comprises a rosin or a rosin derivative. In addition to serving as a viscosifier and a lubricant, the rosin or rosin derivative can improve the moisture resistance of the composite material. Meanwhile, the rosin or rosin derivative can also enhance the impregnation of the chlorinated poly(propylene carbonate), thereby improving the mechanical property of the chlorinated poly(propylene carbonate)/biomass composite material. In the present invention, the rosin derivative is preferably a rosin soap, a rosin ester or a rosin-modified phenolic resin. An amount of the rosin or the rosin derivative is from 2 wt % to 20 wt %, preferably from 3 wt % to 15 wt %, and more preferably from 5 wt % to 15 wt %.

In the present invention, the chlorinated poly(propylene carbonate)/biomass composite further comprises an antioxidant. The antioxidant can retard or inhibit the progress of the oxidation of the polymer, thereby preventing the aging of the polymer and extending its service life. The antioxidant is preferably Antioxidant 1010. An amount of the antioxidant is from 0 wt % to 1 wt %, and preferably from 0.1 wt % to 0.5 wt %.

In the present invention, the chlorinated poly(propylene carbonate)/biomass composite material further comprises a filler. The filler is preferably calcium carbonate or paraffin. An amount of the filler is from 0 wt % to 5 wt %, and preferably from 0 wt % to 1 wt %.

The chlorinated poly(propylene carbonate)/biomass composite material provided in the present invention comprises:
    3 wt % to 57 wt % of a chlorinated poly(propylene carbonate);
    40 wt % to 94 wt % of a biomaterial;
    2 wt % to 20 wt % of a rosin or a rosin derivative;
    0 wt % to 1 wt % of an antioxidant; and
    0 wt % to 5 wt % of a filler,
    wherein a sum of amounts of all components is 100 wt %.

Under the synergistic effect of the above components, the chlorinated poly(propylene carbonate)/biomass composite material obtained in the present invention is excellent in both moisture resistance and mechanical property.

The present invention further provides a method for preparing a chlorinated poly(propylene carbonate)/biomass composite material, comprising:
    A) mixing a chlorinated poly(propylene carbonate), a biomaterial, a rosin or a rosin derivative, an antioxidant, and a filler to obtain a mixture; and
    B) subjecting the mixture to extrusion molding to obtain a chlorinated poly(propylene carbonate)/biomass composite material; or subjecting the mixture to spreading, preheating, hot pressing, and then cold press molding to obtain a chlorinated poly(propylene carbonate)/biomass composite material; or subjecting the mixture to melt blending, granulating, and then injection molding to obtain a chlorinated poly(propylene carbonate)/biomass composite material.

The chlorinated poly(propylene carbonate)/biomass composite material provided in the present invention comprises a new material, that is, a chlorinated poly(propylene carbonate). A weight average molecular weight of the chlorinated poly(propylene carbonate) is in a range of 30,000 to 650,000, and preferably 150,000 to 400,000. The chlorinated poly(propylene carbonate) has a structure represented by Formula (I):

wherein x is an integer of 0 to 3, y is an integer of 0 to 2, and z is an integer of 0 to 1, with the proviso that not all of x, y and z are 0; and n is a polymerization degree of preferably 50 to 5000.

The source of the chlorinated poly(propylene carbonate) is not particularly limited in the present invention, which may be prepared in laboratory, or bought from the market. It should be specifically noted that x, y, z and n typically have different values for different molecular chains of the chlorinated poly(propylene carbonate). That is, the chlorinated poly(propylene carbonate) is a mixture of molecules with various structures for which the above x, y, z and n are in their value range. Generally, weight average molecular weight and chlorination degree are used as basic parameters for the chlorinated poly(propylene carbonate). The chlorination degree refers to a percentage of the total weight of all chlorines (regardless of the positions thereof in the molecular chain) in the chlorinated poly(propylene carbonate) with respect to the total weight of the chlorinated poly(propylene carbonate). Preferably, the chlorination degree of the chlorinated poly(propylene carbonate) is in a range of 2 wt % to 15 wt %. In the present invention, the chlorinated poly (propylene carbonate)s produced by Shandong Weifang Tianrui Chemical Co., Ltd (for example, CPPC-SY01, which has a structure represented by the above Formula (I), a weight average molecular weight of 250,000, and a chlorination degree of 4 wt %; CPPC-SY02, which has a structure represented by the above Formula (I), a weight average molecular weight of 300,000, and a chlorination degree of 3 wt %; and CPPC-SY03, which has a structure represented by the above Formula (I), a weight average molecular weight of 200,000, and a chlorination degree of 5 wt %) are preferably used.

The components and amounts of the biomaterial, the rosin or rosin derivative, the antioxidant and the filler are as described above, and will not be reiterated here. The sources of these starting materials are not particularly limited in the present invention, and typically, they may be commercially available.

In the present invention, a chlorinated poly(propylene carbonate), a biomaterial, a rosin or a rosin derivative, an antioxidant, and a filler are mixed to obtain a mixture. Particularly and preferably, the chlorinated poly(propylene carbonate), the biomaterial, the rosin or rosin derivative, the antioxidant, and the filler are mixed, and then the mixed materials are stirred homogeneously to obtain a mixture. The stirring process is not particularly limited in the present invention, and may be any stirring process well known for those skilled in the art.

Then, in the present invention, the mixture is extrusion molded to obtain a chlorinated poly(propylene carbonate)/biomass composite material. The resulting chlorinated poly(propylene carbonate)/biomass composite material is a profile. The process and parameters for the extrusion molding are not particularly limited in the present invention, and may be any process and parameters well known for those skilled in the art.

Particularly and preferably, the mixture is added into an XSS-300 torque rheometer, and blended for 5 min at a rotation rate of 60 rpm at a temperature of 150° C. to obtain a blended composite material of the chlorinated poly(propylene carbonate) and straws, which is then press molded with a template.

Alternatively, the mixture is spread, preheated, hot pressed, and then cold press molded to obtain a chlorinated poly(propylene carbonate)/biomass composite material. The resulting chlorinated poly(propylene carbonate)/biomass composite is a board. The processes and parameters for the spreading, preheating, hot pressing, and subsequent cold press molding are not particularly limited in the present invention, and may be any processes and parameters well known for those skilled in the art.

In the present invention, the temperature for the spreading and preheating is preferably 170° C., and the time for the spreading and preheating is preferably 5 min. The temperature for the hot pressing is preferably 170° C., the pressure for the hot pressing is preferably 10 MPa, and the time for the hot pressing is preferably 5 min. The pressure for the cold press molding is preferably 10 MPa, and the time for the cold press molding is preferably 8 min.

Alternatively, the mixture is melt blended, granulated, and then injection molded to obtain a chlorinated poly(propylene carbonate)/biomass composite material. The resulting chlorinated poly(propylene carbonate)/biomass composite may be various devices or components. The processes and parameters for the melt blending, granulating and subsequent injection molding are not particularly limited in the present invention, and may be any processes and parameters well known for those skilled in the art.

In the present invention, the melt blending is preferably performed in the following amounts of components: 50% to 60% of the biomass material, 25% to 35% of the chlorinated poly(propylene carbonate), 10% to 20% of the rosin or rosin resin, and 0.1% to 0.2% of the Antioxidant 1010. The mixture is added into an XSS-300 torque rheometer, and blended for 5 min at a rotation rate of 60 rpm at a temperature of 150° C.

In the chlorinated poly(propylene carbonate)/biomass composite prepared in the present invention, in addition to functioning as a binder, the chlorinated poly(propylene carbonate) can provide the composite material with heat shrinkage property and flowability, and also play an important role in the moisture resistance of the composite material as formed. In addition to serving as a viscosifier and a lubricant, the rosin or rosin derivative added can improve the moisture resistance of the composite material. Meanwhile, the rosin or rosin derivative can also enhance the impregnation of the chlorinated poly(propylene carbonate), thereby improving the mechanical property of the chlorinated poly(propylene carbonate)/biomass composite material. Under the synergistic effect of the above components, the chlorinated poly(propylene carbonate)/biomass composite material obtained in the present invention is excellent in both moisture resistance and mechanical property. Furthermore, because the composite material as disclosed in the present invention has a large proportion of biomass material and requires no formaldehyde, benzene and so on in starting materials, it follows that the cost is low and the material is environment friendly.

In order to further illustrate the present invention, the chlorinated poly(propylene carbonate)/biomass composite material and the method for preparing the same provided in the present invention will be described in detail below with reference to examples. However, the examples cannot be construed as limiting the protection scope of the present invention.

Example 1

Corn straw powders, a chlorinated poly(propylene carbonate) (CPPC-SY01, Shandong Weifang Tianrui Chemical Co., Ltd), a rosin ester, Antioxidant 1010 and calcium carbonate were mixed and stirred homogeneously to obtain a mixture. Four mixtures were formulated with mass fractions of components in the mixtures as shown in Table 1.

TABLE 1

Mass fractions of the components in the four mixtures obtained in Example 1

| | Corn straw powders | Chlorinated poly(propylene carbonate) | Rosin ester | Antioxidant 1010 | Calcium carbonate |
|---|---|---|---|---|---|
| 1 | 60% | 30% | 8.9% | 0.1% | 1% |
| 2 | 70% | 22% | 6.9% | 0.1% | 1% |
| 3 | 80% | 15% | 4.9% | 0.1% | 0 |
| 4 | 90% | 7% | 2.9% | 0.1% | 0 |

The above mixture was stirred homogeneously, then spread, and preheated for 5 min at 170° C. The pressure was increased to 10 MPa while maintaining the temperature, and then the temperature and pressure were maintained for 5 min. Then, the mixture was cold pressed for 8 min with the pressure maintained at 10 MPa to obtain a composite board of the chlorinated poly(propylene carbonate) and the corn straw powders.

Figure 1:
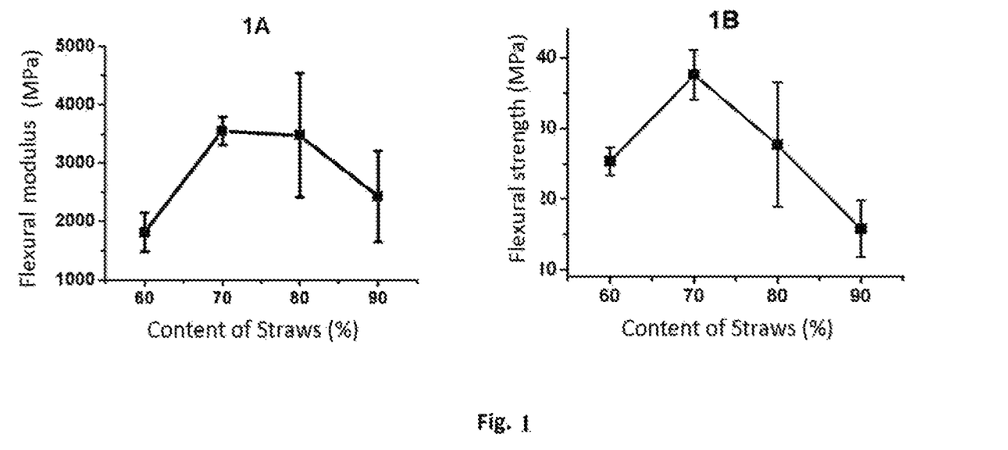
FIG. 1 shows graphs of the flexural modulus and the flexural strength of the composite board prepared in Example 1.

The flexural deformation and tolerable pressure strength of the composite boards obtained in this Example were investigated and the results are as shown in FIG. 1. FIG. 1 shows graphs of the flexural modulus and the flexural strength of the composite board prepared in Example 1. Here, FIG. 1A is the flexural modulus graph of the composite board prepared in Example 1, and FIG. 1B is the flexural strength graph of the composite board prepared in Example 1. The results indicate that the flexural modulus of the composite board is not less than 1800 MPa, and the flexural strength of the composite board is not less than 15 MPa.

Figure 2:
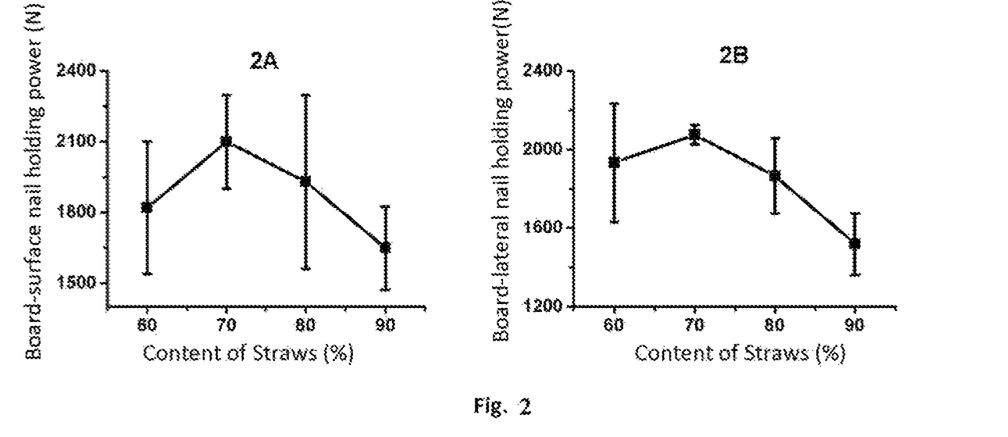
FIG. 2 shows graphs of the board-surface nail holding power and the board-lateral nail holding power of the composite board prepared in Example 1.

The above composite boards were measured according to Section 4.21, Method of testing nail holding power, in GB/T17657-2013, "Testing Methods of Evaluating the Properties of Artificial boards and Surface Decorated Artificial boards", to measure the board-surface nail holding power and board-lateral nail holding power of the composite board, which are shown in FIG. 2. FIG. 2 shows graphs of the board-surface nail holding power and the board-lateral nail holding power of the composite board prepared in Example 1. Here, FIG. 2A is the board-surface nail holding power graph of the composite board prepared in Example 1, and FIG. 2B is the board-lateral nail holding power graph of the composite board prepared in Example 1. The results indicate that the board-surface nail holding power of the composite board is not less than 1400 N, and the board-lateral nail holding power of the composite board is not less than 1600 N.

Example 2

Wood chip powders, a chlorinated poly(propylene carbonate) (CPPC-SY01, Shandong Weifang Tianrui Chemical Co., Ltd), a rosin ester, Antioxidant 1010 and calcium carbonate were mixed and stirred homogeneously to obtain a mixture. Four mixtures were formulated with mass fractions of components in the mixtures as shown in Table 2.

TABLE 2

Mass fractions of the components in the four mixtures obtained in Example 2

|   | Wood chip powders | Chlorinated poly(propylene carbonate) | Rosin ester | Antioxidant 1010 | Calcium carbonate |
|---|---|---|---|---|---|
| 1 | 60% | 30% | 8.9% | 0.1% | 1% |
| 2 | 70% | 22% | 6.9% | 0.1% | 1% |
| 3 | 80% | 15% | 4.9% | 0.1% | 0 |
| 4 | 90% | 7% | 2.9% | 0.1% | 0 |

The above mixture was stirred homogeneously, then spread, and preheated for 5 min at 170° C. The pressure was increased to 10 MPa while maintaining the temperature, and then the temperature and pressure were maintained for 5 min. Then, the mixture was cold pressed for 8 min with the pressure maintained at 10 MPa to obtain a composite board of the chlorinated poly(propylene carbonate) and the wood chip powders.

Figure 3:
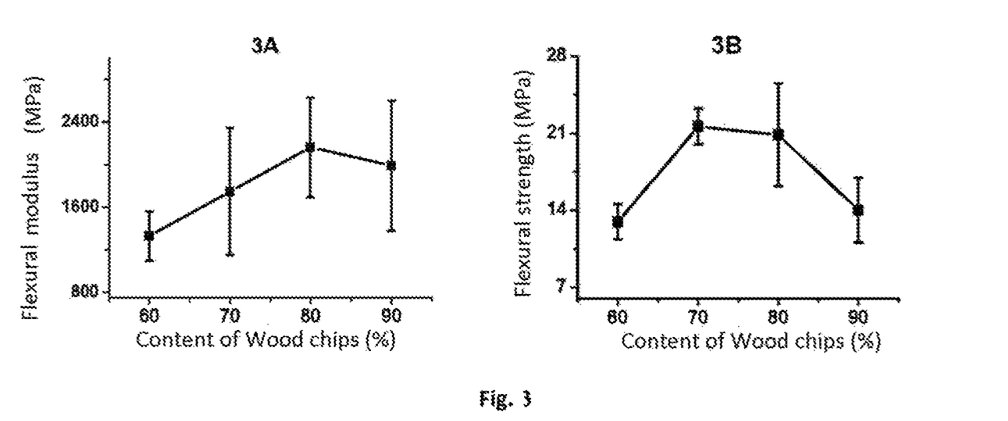
FIG. 3 shows graphs of the flexural modulus and the flexural strength of the composite board prepared in Example 2.

The flexural deformation and tolerable pressure strength of the composite boards obtained in this Example were investigated and the results are as shown in FIG. 3. FIG. 3 shows graphs of the flexural modulus and the flexural strength of the composite board prepared in Example 2. Here, FIG. 3A is the flexural modulus graph of the composite board prepared in Example 2, and FIG. 3B is the flexural strength graph of the composite board prepared in Example 2. The results indicate that the flexural modulus of the composite board is not less than 1300 MPa, and the flexural strength of the composite board is not less than 13 MPa.

Figure 4:
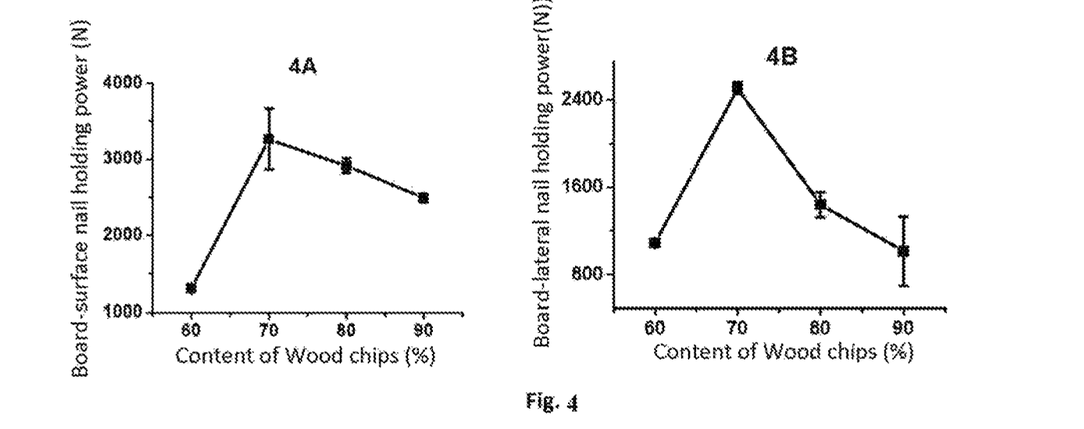
FIG. 4 shows graphs of the board-surface nail holding power and the board-lateral nail holding power of the composite board prepared in Example 2.

The above composite boards were measured according to Section 4.21, Method of testing nail holding power, in GB/T17657-2013, "Testing Methods of Evaluating the Properties of Artificial boards and Surface Decorated Artificial boards", to measure the board-surface nail holding power and board-lateral nail holding power of the composite board, which are shown in FIG. 4. FIG. 4 shows graphs of the board-surface nail holding power and the board-lateral nail holding power of the composite board prepared in Example 2. Here, FIG. 4A is the board-surface nail holding power graph of the composite board prepared in Example 2, and FIG. 4B is the board-lateral nail holding power graph of the composite board prepared in Example 2. The results indicate that the board-surface nail holding power of the composite board is not less than 1300 N, and the board-lateral nail holding power of the composite board is not less than 1000 N.

Example 3

Bamboo powders, a chlorinated poly(propylene carbonate) (CPPC-SY02, Shandong Weifang Tianrui Chemical Co., Ltd), a rosin ester, Antioxidant 1010 and calcium carbonate were mixed and stirred homogeneously to obtain a mixture. Four mixtures were formulated with mass fractions of components in the mixtures as shown in Table 5.

TABLE 5

Mass fractions of the components in the four mixtures obtained in Example 3

|   | Bamboo powder | Chlorinated poly(propylene carbonate) | Rosin ester | Antioxidant 1010 | Calcium carbonate |
|---|---|---|---|---|---|
| 1 | 60% | 30% | 8.9% | 0.1% | 1% |
| 2 | 70% | 22% | 6.9% | 0.1% | 1% |
| 3 | 80% | 15% | 4.9% | 0.1% | 0 |
| 4 | 90% | 7% | 2.9% | 0.1% | 0 |

The above mixture was stirred homogeneously, then spread, and preheated for 5 min at 170° C. The pressure was increased to 10 MPa while maintaining the temperature, and then the temperature and pressure were maintained for 5 min. Then, the mixture was cold pressed for 8 min with the pressure maintained at 10 MPa to obtain a composite board of the chlorinated poly(propylene carbonate) and the bamboo powders.

Figure 5:
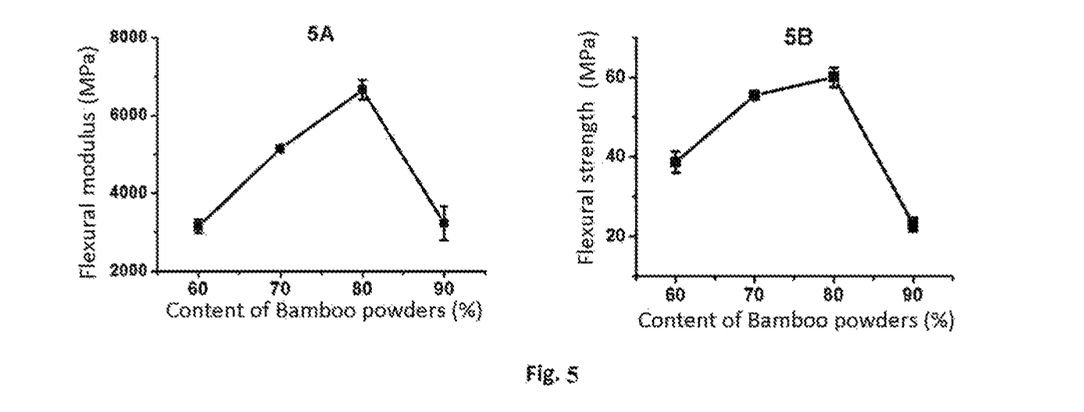
FIG. 5 shows graphs of the flexural modulus and the flexural strength of the composite board prepared in Example 3.

The flexural deformation and tolerable pressure strength of the composite boards obtained in this Example were investigated and the results are as shown in FIG. 5. FIG. 5 shows graphs of the flexural modulus and the flexural strength of the composite board prepared in Example 3. Here, FIG. 5A is the flexural modulus graph of the composite board prepared in Example 3, and FIG. 5B is the flexural strength graph of the composite board prepared in Example 3. The results indicate that the flexural modulus of the composite board is not less than 3100 MPa, and the flexural strength of the composite board is not less than 23 MPa.

Figure 6:
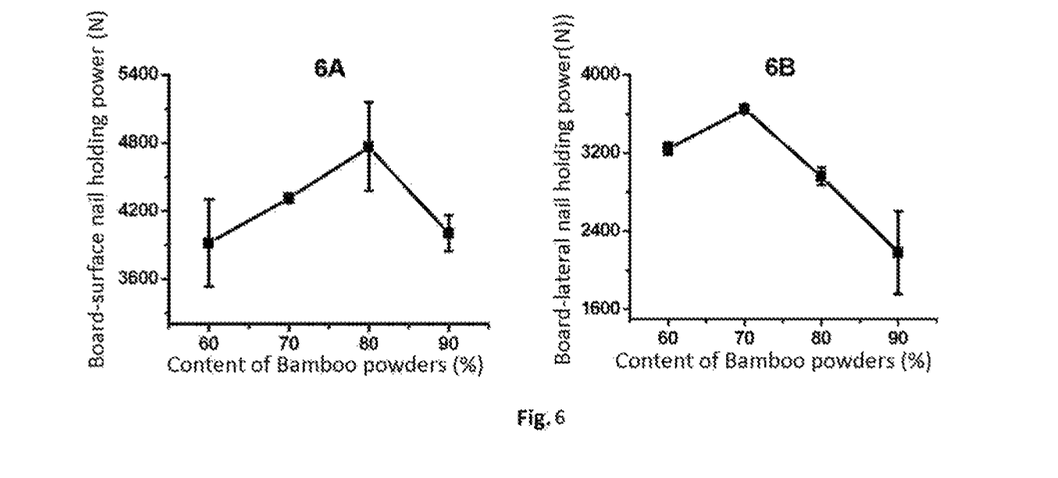
FIG. 6 shows graphs of the board-surface nail holding power and the board-lateral nail holding power of the composite board prepared in Example 3.

The above composite boards were measured according to Section 4.21, Method of testing nail holding power, in GB/T17657-2013, "Testing Methods of Evaluating the Properties of Artificial boards and Surface Decorated Artificial boards", to measure the board-surface nail holding power and board-lateral nail holding power of the composite board, which are shown in FIG. 6. FIG. 6 shows graphs of the board-surface nail holding power and the board-lateral nail holding power of the composite board prepared in Example 3. Here, FIG. 6A is the board-surface nail holding power graph of the composite board prepared in Example 3, and FIG. 6B is the board-lateral nail holding power graph of the composite board prepared in Example 3. The results indicate that the board-surface nail holding power of the composite board is not less than 3900 N, and the board-lateral nail holding power of the composite board is not less than 2180 N.

Example 4

Straw powders, a chlorinated poly(propylene carbonate) (CPPC-SY03, Shandong Weifang Tianrui Chemical Co., Ltd), a rosin ester, Antioxidant 1010 and calcium carbonate were mixed and stirred homogeneously to obtain a mixture. Four mixtures were formulated with mass fractions of components in the mixtures as shown in Table 7.

TABLE 7

Mass fractions of the components in the four mixtures obtained in Example 4

| | Straw powder | Chlorinated poly(propylene carbonate) | Rosin ester | Antioxidant 1010 | Calcium carbonate |
|---|---|---|---|---|---|
| 1 | 60% | 30% | 8.9% | 0.1% | 1% |
| 2 | 70% | 22% | 6.9% | 0.1% | 1% |
| 3 | 80% | 15% | 4.9% | 0.1% | 0 |
| 4 | 90% | 7% | 2.9% | 0.1% | 0 |

Figure 7:
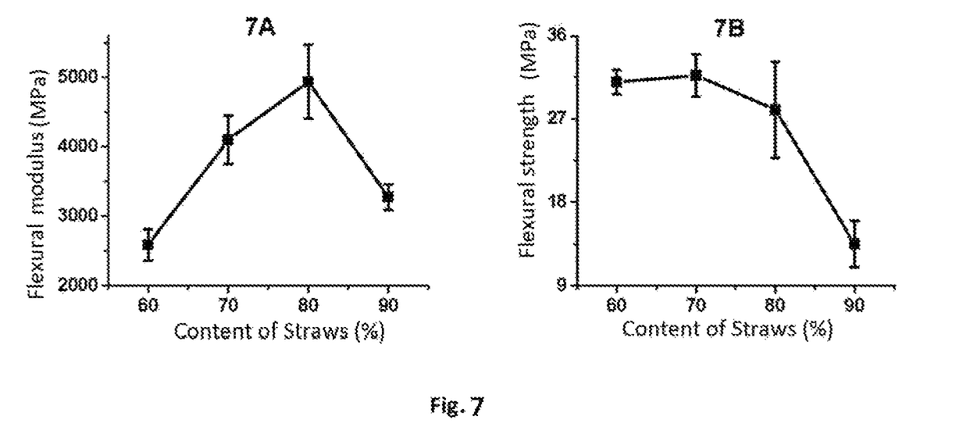
FIG. 7 shows graphs of the flexural modulus and the flexural strength of the composite board prepared in Example 4.

The mixture was added into an XSS-300 torque rheometer, and blended for 5 min at a rotation rate of 60 rpm at a temperature of 150° C. to obtain a blended composite material of the chlorinated poly(propylene carbonate) and straws, which was then press molded with a template. The flexural deformation and tolerable pressure strength of the composite boards obtained in this Example were investigated and the results are as shown in FIG. 7. FIG. 7 shows graphs of the flexural modulus and the flexural strength of the composite board prepared in Example 4. Here, FIG. 7A is the flexural modulus graph of the composite board prepared in Example 4, and FIG. 7B is the flexural strength graph of the composite board prepared in Example 4. The results indicate that the flexural modulus of the composite board is not less than 2500 MPa, and the flexural strength of the composite board is not less than 13 MPa.

The above composite board obtained from the above first mixture was measured according to Section 4.4, Method I of testing thickness expansion rate of water absorbing, in GB/T17657-2013, "Testing Methods of Evaluating the Properties of Artificial boards and Surface Decorated Artificial boards". That is, the above composite board was placed in water at a depth of 10 cm, and measured for its thickness once per hour. The change in thickness is as shown in Table 8.

TABLE 8

Water absorbing expansion test for the composite obtained in Example 4

| Time in water (h) | Change in thickness (mm) |
|---|---|
| 0 | 4.5 |
| 3 | 4.5 |
| 6 | 4.7 |

The experimental results indicate that after the composite board prepared in the present invention was soaked in water for 6 h, the thickness thereof did not change significantly, suggesting that the moisture resistance of the composite board is excellent.

The above description of the embodiments as disclosed will allow those skilled in the art to achieve or implement the present invention. Various modifications on the embodiments will be obvious for those skilled in the art. The general principle as defined herein can be achieved in other embodiments without departing from the spirit or scope of the present invention. Therefore, the present invention is not limited to the embodiments as shown herein, and should construed as the broadest scope in accordance with the principle and novel features as disclosed herein.

What is claimed is:

1. A chlorinated poly(propylene carbonate)/biomass composite material, comprising a mixture comprising:
    7 wt % to 30 wt % of a chlorinated poly(propylene carbonate);
    60 wt % to 90 wt % of a biomaterial comprising one or more materials selected from the group consisting of straws, wood chips, halms, rice hulls, bamboo powders and wheat straws;
    2.9 wt % to 8.9 wt % of a rosin or a rosin derivative;
    0 wt % to 0.1 wt % of an antioxidant; and
    0 wt % to 1 wt % of a filler,
    wherein a sum of amounts of all components is 100 wt %.

2. The chlorinated poly(propylene carbonate)/biomass composite material according to claim 1, wherein the chlorinated poly(propylene carbonate) has a weight average molecular weight in a range of 30,000 to 650,000.

3. The chlorinated poly(propylene carbonate)/biomass composite material according to claim 1, wherein the chlorinated poly(propylene carbonate) has a chlorination degree in a range of 2 wt % to 15 wt %.

4. The chlorinated poly(propylene carbonate)/biomass composite material according to claim 1, wherein the chlorinated poly(propylene carbonate) has a structure represented by Formula (I) below:

(I)

wherein x is an integer of 0 to 3, y is an integer of 0 to 2, and z is an integer of 0 to 1, with the proviso that not all of x, y and z are 0; and n is a polymerization degree of 50 to 5000.

5. The chlorinated poly(propylene carbonate)/biomass composite material according to claim 1, wherein the rosin derivative is a rosin soap, a rosin ester or a rosin-modified phenolic resin.

6. The chlorinated poly(propylene carbonate)/biomass composite material according to claim 1, wherein the filler is calcium carbonate or paraffin.

7. A method for preparing a chlorinated poly(propylene carbonate)/biomass composite material, comprising:
    A) mixing 7 wt % to 30 wt % of a chlorinated poly (propylene carbonate), 60 wt % to 90 wt % of a biomaterial, 2.9 wt % to 8.9 wt % of a rosin or a rosin derivative, 0 wt % to 0.1 wt % of an antioxidant, and 0 wt % to 1 wt % of a filler to obtain a mixture, wherein a sum of amounts of all components is 100 wt %, wherein the biomaterial comprises one or more materials selected from the group consisting of straws, wood chips, halms, rice hulls, bamboo powders and wheat straws; and B) subjecting the mixture to extrusion molding to obtain a chlorinated poly(propylene carbonate)/biomass composite material; or subjecting the mixture to spreading, preheating, hot pressing, and then cold press molding to obtain a chlorinated poly(propylene carbonate)/biomass composite material; or subjecting the mixture to melt blending, granulating, and then injection molding to obtain a chlorinated poly(propylene carbonate)/biomass composite material.

8. The method for preparing a chlorinated poly(propylene carbonate)/biomass composite material according to claim 7, wherein the chlorinated poly(propylene carbonate) has a weight average molecular weight in a range of 30,000 to 650,000.

9. The method for preparing a chlorinated poly(propylene carbonate)/biomass composite material according to claim 7, wherein the chlorinated poly(propylene carbonate) has a chlorination degree in a range of 2 wt % to 15 wt %.

10. The method for preparing a chlorinated poly(propylene carbonate)/biomass composite material according to claim 7, wherein the chlorinated poly(propylene carbonate) has a structure represented by Formula (I) below:

wherein x is an integer of 0 to 3, y is an integer of 0 to 2, and z is an integer of 0 to 1, with the proviso that not all of x, y and z are 0; and n is a polymerization degree of 50 to 5000.

11. The method for preparing a chlorinated poly(propylene carbonate)/biomass composite material according to claim 7, wherein the rosin derivative is a rosin soap, a rosin ester or a rosin-modified phenolic resin.

12. The method for preparing a chlorinated poly(propylene carbonate)/biomass composite material according to claim 7, wherein the filler is calcium carbonate or paraffin.

13. The chlorinated poly(propylene carbonate)/biomass composite material according to claim 1, wherein the biomaterial is in a powder form.

* * * * *